United States Patent [19]

Fritsch et al.

[11] Patent Number: 5,486,663
[45] Date of Patent: Jan. 23, 1996

[54] MOTOR CONTROL CENTER REMOVABLE CONTROL UNIT INTERLOCK

[75] Inventors: Ronald J. Fritsch, Menomonee Falls; Richard J. Holland, Glendale, both of Wis.

[73] Assignee: Eaton Corporation, Cleveland, Ohio

[21] Appl. No.: 325,739

[22] Filed: Oct. 19, 1994

[51] Int. Cl.⁶ .................................................. H01H 9/20
[52] U.S. Cl. .............................. 200/50 R; 200/50 AA; 361/609
[58] Field of Search ............................. 200/50 R, 50 A, 200/50 AA; 361/607, 609, 615, 616

[56] References Cited

U.S. PATENT DOCUMENTS 2,186,640   1/1940   Jirka et al. ............................. 337/196
4,074,091   2/1978   Bischof et al. ....................... 200/50 A
4,912,599   3/1990   Wittmer ................................. 200/50 R
5,019,676   5/1991   Heckenkamp ......................... 200/50 A

*Primary Examiner*—J. R. Scott
*Attorney, Agent, or Firm*—Larry G. Vande Zande

[57] ABSTRACT

A manually rotatable latch of a control unit has an oblong cross-section shalt extending through a keyhole slot in a slider, the wide dimension of the shaft being greater than the narrow portion of the slider, to block movement of the slider when the latch is extended to lock the unit to the cabinet or block insertion of the unit to the cabinet. A link from the slider extends into the path of movement of an operator to block movement of the operator to an ON position of switching apparatus of the control unit when the latch is extended. The link takes advantage of optimal latch location substantially centered in the control unit to minimize twisting of the unit within the cabinet when removal is attempted without releasing the latch.

11 Claims, 5 Drawing Sheets

5,486,663

MOTOR CONTROL CENTER REMOVABLE CONTROL UNIT INTERLOCK

BACKGROUND OF THE INVENTION

This invention relates to motor control centers having departmentalized cabinets for receiving removable control units which are inserted or withdrawn through open fronts of the respective compartments. More particularly, this invention relates to an interlock between an operator mechanism for switching apparatus of the removable control unit and a unit latch on the removable control unit, the interlock insuring that the latch is in an extended, blocking position when the switch apparatus is in the ON condition to block insertion or removal of the control unit with the switch ON.

Motor control centers comprise a cabinet having a plurality of vertically arranged compartments which open to a forward face of the cabinet. The individual compartments may be of varying height, each defined by a structural transverse wall member extending between the upright walls of the cabinet and separating one compartment from another. Each compartment further comprises a door individual to that compartment hinged on the cabinet at one side of the compartment for closing off the same. Electrically hot bus bars are disposed within the cabinet to commonly extend through each of the compartments. Removable motor control units are insertably received individually within the respective compartments from the open front thereof with the respective door open. The removable control units contain motor control apparatus which may comprise circuit interrupting apparatus such as circuit breakers or fusible disconnect switches each having manual switch operation capabilities. Such circuit interrupting (switching) apparatus has its own operator mechanism, but auxiliary operating mechanisms are provided on the control unit which enable the apparatus to be operated from the exterior of the motor control center cabinet.

For most control units, the switching apparatus is oriented for vertical movement of the operator. However, the smallest size compartment (typically a six inch height) does not permit vertical orientation of the switching apparatus or the operator. These units have the switching apparatus oriented for horizontal operator movement.

The removable control units also comprise plug-in connectors which engage the electrical bus bars within the cabinet when the control unit is fully inserted into the compartment opening. Therefore it is important that the switching apparatus be in the OFF position when either inserting or removing the control unit from the compartment. Accordingly, interlocks are provided on the control unit, usually driven by the operator mechanism, to engage some portion of the cabinet to prevent insertion or withdrawal of the control unit when the switching apparatus is in the ON position.

SUMMARY OF THE INVENTION

This invention provides an interlock between switching apparatus of a motor control center removable control unit and the cabinet of the motor control center for preventing insertion or removal of the removable control unit with the switching apparatus in the ON position. Engagement of the interlock with the cabinet occurs near the center of the control unit to minimize twisting of the unit within the compartment in the event it is attempted to remove the unit without first operating the switching apparatus to the OFF position. The invention, its advantages and features will become more readily apparent when reading the following description and claims in conjunction with the accompanying drawings.

DETAILED DESCRIPTION OF THE PREFERRED EMBODIMENT

Figure 1:
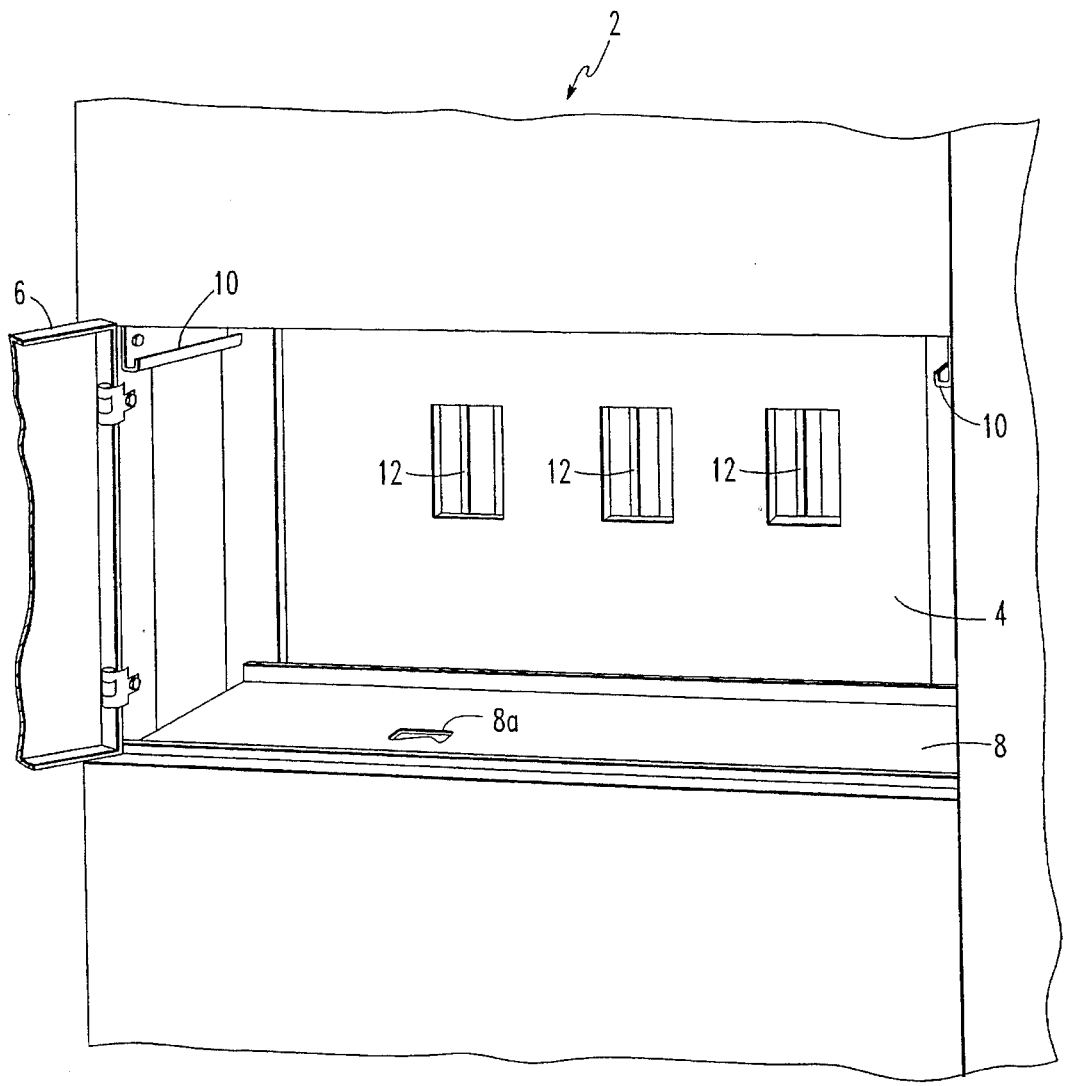
FIG. 1 is a perspective view showing a portion of a motor control center cabinet wherein a door of one compartment is open.

A portion of a motor control center cabinet 2 is shown in FIG. 1. The cabinet 2 has a compartment 4 open to the front of the cabinet when a door 6, hinged to the cabinet at one side, is swung open. Compartment 4 is defined by the frontal opening, side walls of the cabinet 2 and by a pair of transverse structural wall members 8 which are secured in the cabinet to provide a separation between adjacent compartments. As may be seen in FIG. 1, the structural wall member 8 has an elongated slot 8a disposed with its major dimension oriented parallel to the front of the cabinet. Slot 8a has a hill and valley cam shaped forward edge to provide a detent for the pin of a latch member of the interlock of this invention as will be more fully described later. A pair of depending J-shaped guides 10 are provided on the cabinet within each compartment, the guides 10 having inwardly and upwardly turned flanges at their distal ends for receiving the removable control unit, also to be more fully described hereinafter. A plurality of vertically oriented bus bars 12 are provided within the interior of cabinet 2 and extend commonly within each of the compartments of the motor control center cabinet 2.

A removable control unit 14 comprises a pair of sheet metal fabricated side plate assemblies 16 and 18 and a back plate 20. A metal channel 22 is attached between the side plates 16 and 18 at the forward upper corners thereof to provide a handle for the removable control unit, the open portion of the channel 22 facing downwardly. An electrical connector module 24 (FIG. 3) is attached to rear plate 20. The connector module 24 comprises three plug-in electrical connector terminals 26 which correspondingly align with respective ones of the bus bars 12 when the removable control unit 14 is inserted within compartment 4. Switching apparatus such as a molded case circuit breaker 28 is mounted within the removable control unit 14 on brackets 30 and 32 which are fastened together and to side plate 18 and rear plate 20 to form a supporting platform for the circuit breaker 28. A fusible switch is an alternate form of switching apparatus contained in removable control units. Other elements of control apparatus contained within the motor control unit 14 are not pertinent to this invention and have not been shown for clarity in the drawings and brevity of the description. A pair of slides 16a and 18a, are formed on side plates 16 and 18 respectively. The slides 16a, 18a project outwardly from the side plates and extend downwardly to slidably engage within the channel of the respective J-shaped guides 10. Sliding the removable control unit 14 inwardly along the guides 10 properly locates the unit 14 within the compartment 4, both laterally between the sides of the cabinet and vertically in proper proximity to the adjacent transverse structural wall 8.

Figure 2:
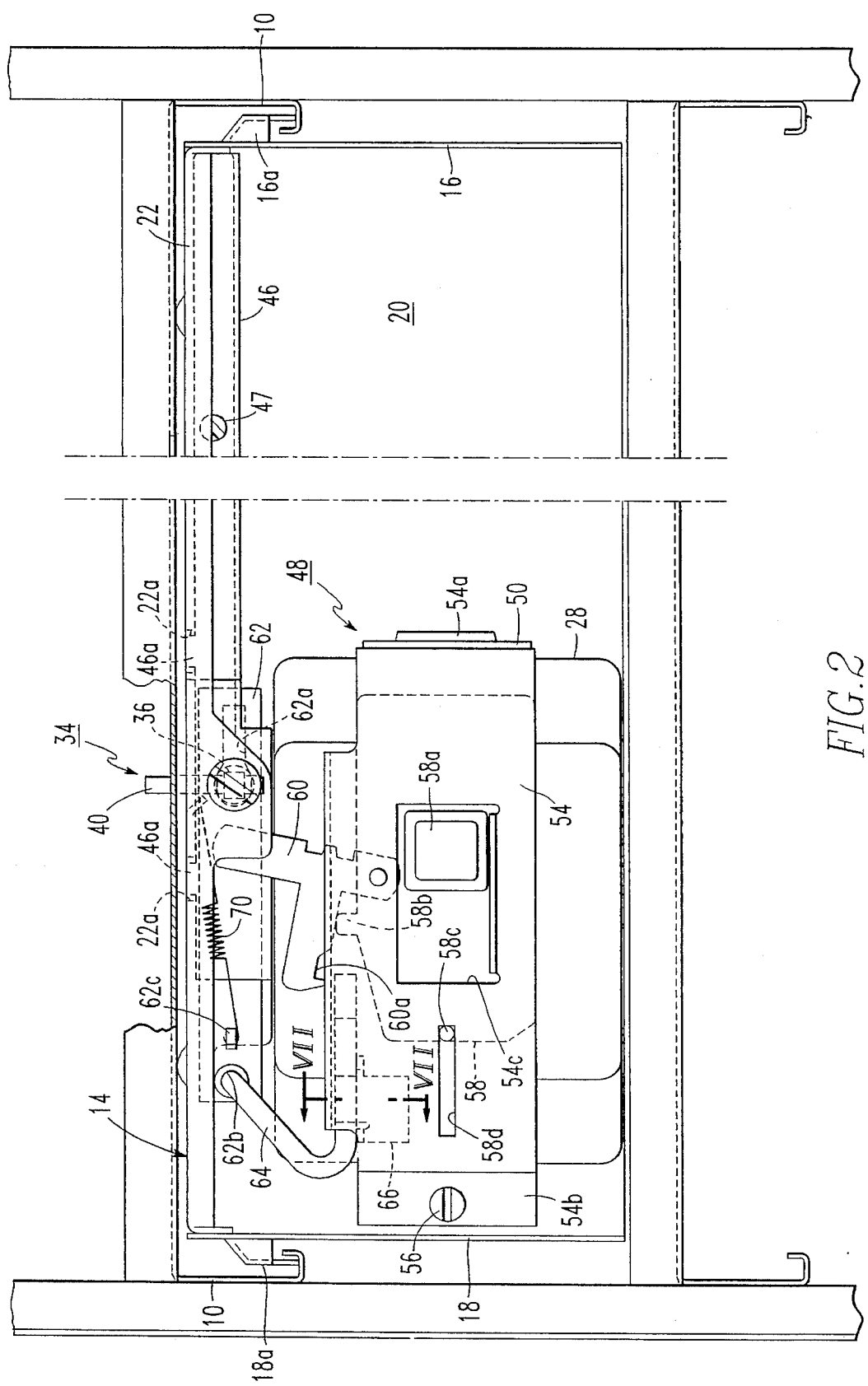
FIG. 2 is a front elevation of the motor control center cabinet compartment with a removable control unit inserted therein and showing the interlock of this invention in a blocking position.
Figure 5:
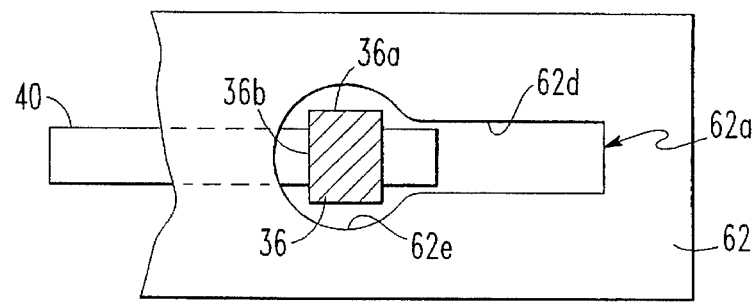
FIG. 5 is a partial view of a latch portion of the interlock rotated to a retracted position, out of interference with the cabinet structure.
Figure 6:
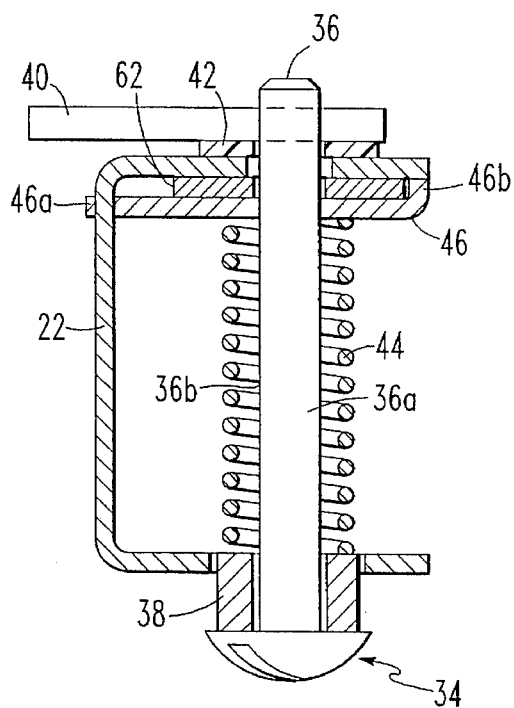
FIG. 6 is a partial cross-section taken through the latch along line 6—6 in FIG. 3.

A manually operable latch 34 is mounted to channel 22 near the middle of control unit 14. Latch 34 comprises a shaft 36 having an oblong cross-section rotatably mounted within aligned holes in the forward and rear depending flanges of channel 22. The oblong cross section of shaft 36 comprises a narrow portion 36a and a wide portion 36b as best seen in FIG. 5. One end of the shaft is headed, having a slot therein for a screwdriver or the like. A cylindrical spacer 38 is disposed over shaft 36 to abut the head of the shaft and to journal the forward end of shaft 36 within a hole in the forward flange of channel 22. The end of shaft 36 remote from the slotted head is provided with a through hole into which is pressed a roll pin 40 to project at right angles to the axis of the shaft. A nylon washer 42 is disposed between the outer surface of the rear leg of channel 22 and the roll pin 40 to reduce friction as the latch 34 is rotated. A helical compression spring 44 is disposed over shaft 36 to bear between an inside face of spacer 38 and a guide bracket 46 which is attached to the channel 22. As may be seen in FIGS. 2, 3 and 6, guide bracket 46 has a pair of upstanding tabs 46a along its upper edge which are received in rectangular holes 22a in channel 22 to position the upper edge of guide bracket 46 relative to channel 22. The lower edge of bracket 46 is bent at right angles to provide a short leg 46b as seen in FIG. 6 which bears against the inside surface of the rear leg of channel 22 to properly space guide bracket 46 from the channel 22. Spring 44 bears against guide bracket 46, pressing it in place against the rear leg of channel 22, and a screw 47 (FIG. 2) fixes bracket 46 to the rear leg of channel 22.

Figure 3:
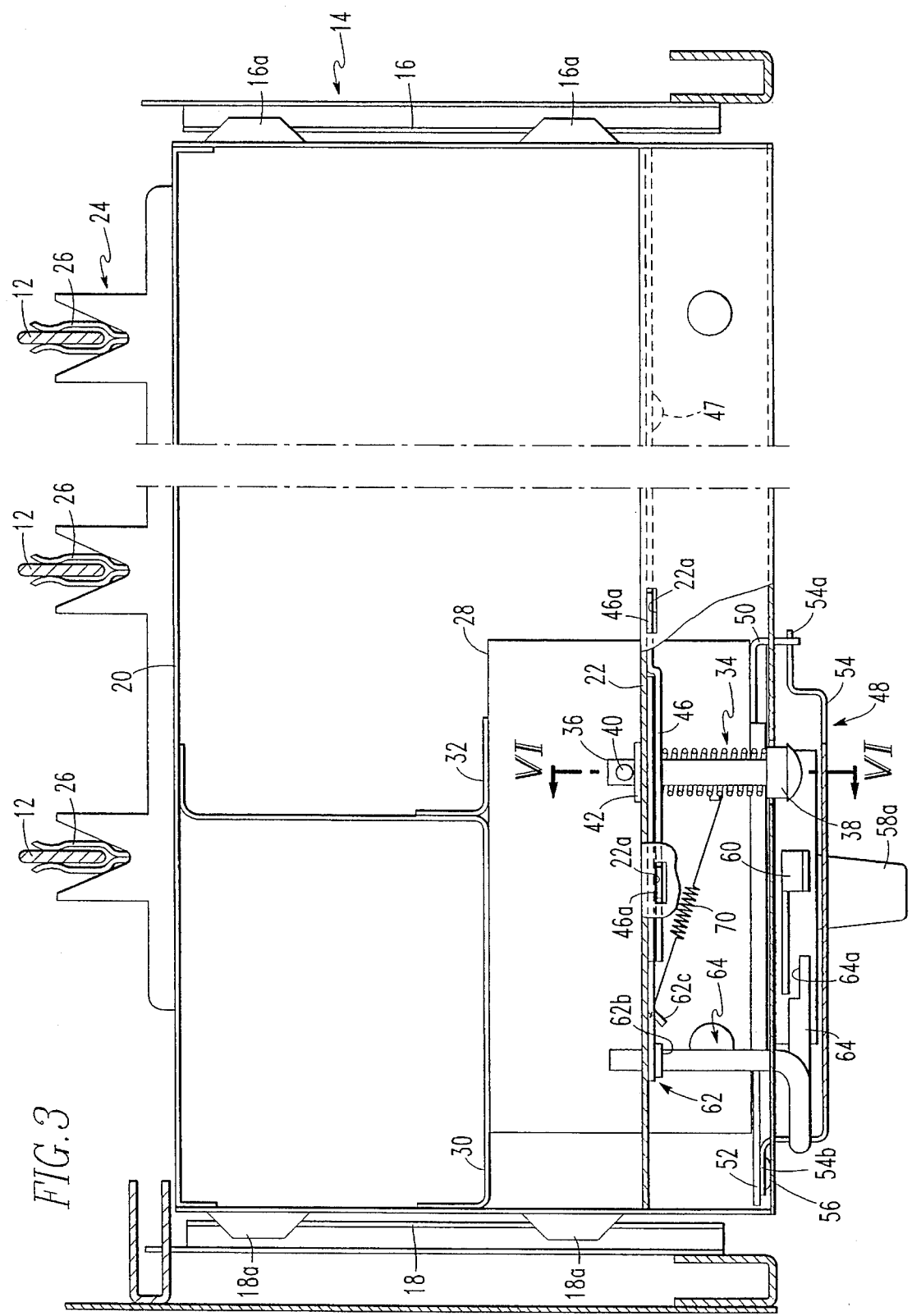
FIG. 3 is a partial cross-sectional view of the motor control center cabinet of FIG. 1 and a top view of the removable control unit of FIG. 2 shown installed in a compartment of the motor control center cabinet.
Figure 4:
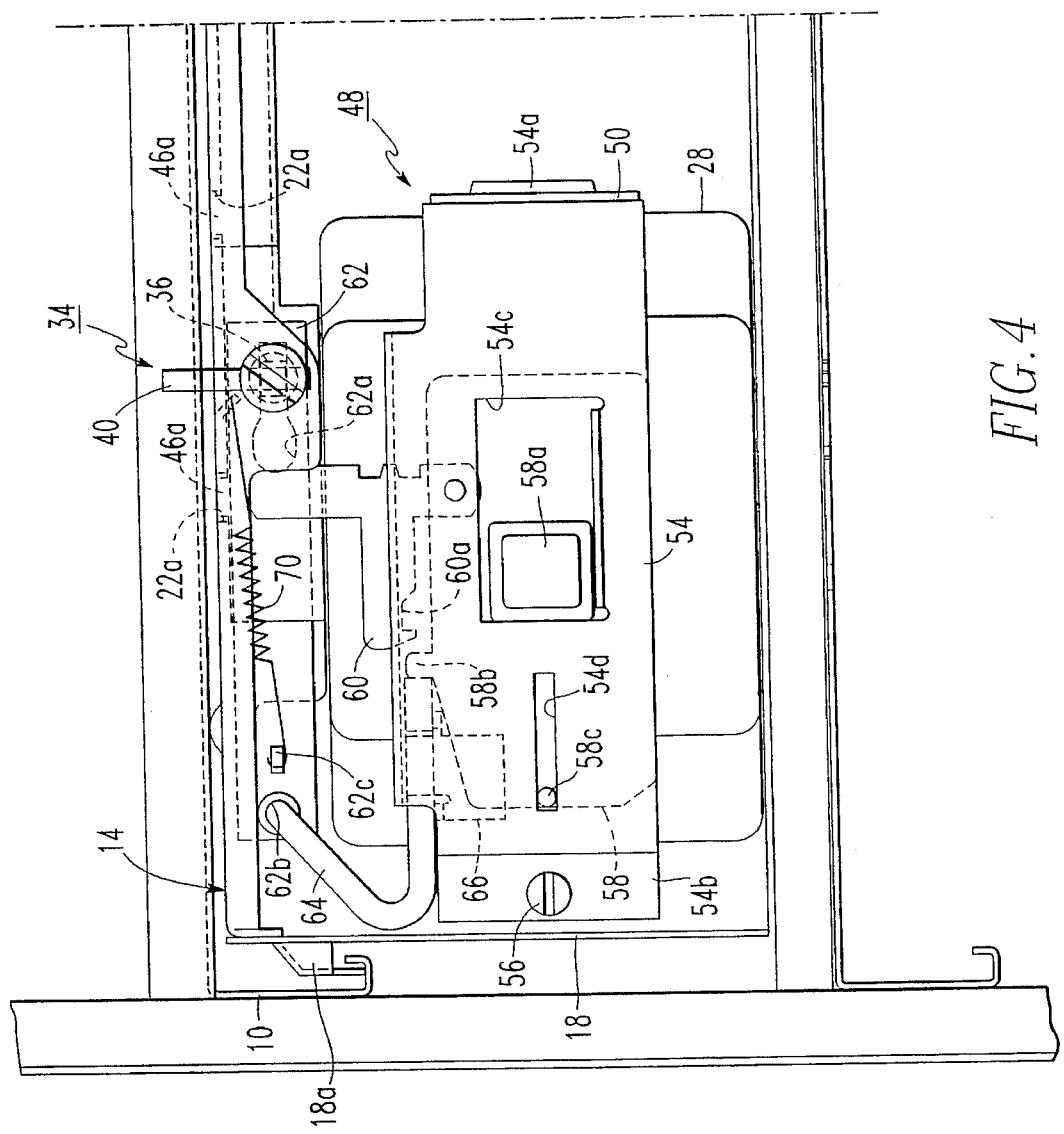
FIG. 4 is a partial front view of the removable control unit showing the operator and the interlock member operated to the "ON" position of the switching apparatus.

A sliding auxiliary operator mechanism 48 is mounted to the front face of molded case circuit breaker 28 by an L-shaped bracket 50 at the right-hand end of circuit breaker 28 as viewed in FIG. 3 and a flat plate 52 at the left-hand end of the circuit breaker. A cover plate 54 has a tongue 54a which extends into and through a slot in L-shaped bracket 50 at the right-hand end. The left-hand end of cover plate 54 is offset rearwardly at 54b to mate with plate 52 and to be secured thereto by a screw 56. The front face of circuit breaker 28 and the cover 54 define a space in which a molded plastic auxiliary operator 58 is disposed for sliding movement left and right as viewed in the drawings. Operator 58 has a handle 58a projecting forwardly through an opening 54c in cover plate 54. Handle 58a is hollow and overlies the operator handle of circuit breaker 28. Auxiliary operator 58 has a tab 58b along its upper edge which cooperates with a pivoted T-shaped lever 60 to provide a door interlock for the control unit 14. A cylindrical boss 58c projects forwardly from operator 58 into an elongated slot 54d in cover plate 54 for guiding the operator 58 for sliding movement. The operator mechanism 48 and the door interlock 60 are described and claimed in U.S. Pat. No. 4,074,091 issued Feb. 14, 1978 to John F. Bischof and Ronald J. Fritsch and assigned by mesne assignments to the assignee of this application. The disclosure of U.S. Pat. No. 4,074,091 is incorporated herein by reference. The left-hand end of lever 60 is provided with a hook 60a which engages tab 58b to block sliding movement of operator 58 leftward to the ON position of the circuit breaker unless the lever 60 is rotated clockwise by a latch (not shown) on the door 6 or manually to raise the hook portion 60a free of the path of tab 58b.

Figure 7:
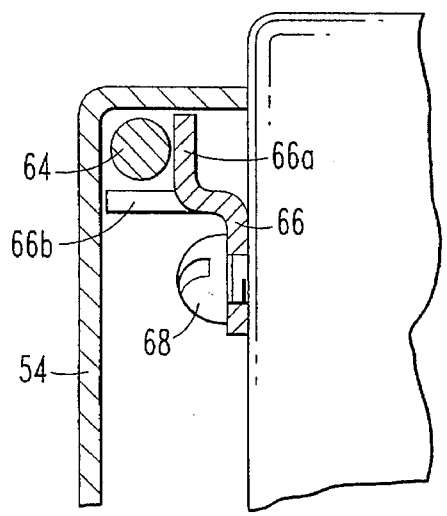
FIG. 7 is a partial section taken along the line 7—7 in FIG. 2 showing a guide bracket for a link rod of the interlock mechanism of this invention.

The interlock of this invention blocks insertion or removal of the control unit 14 into or out of cabinet compartment 4 and engagement with bus bars 12 with the circuit breaker 28 or other switching apparatus operated to the ON position. A substantially flat plate slider 62 is disposed between the rear leg of channel 22 and guide bracket 46 for linear sliding movement along the inside surface of the rear leg of channel 22. Slider 62 has a keyhole slot 62a at the right-hand end through which is disposed the oblong shaft 36 of latch 34. Keyhole slot 62a comprises a narrow portion 62d which opens into an enlarged, generally circular hole 62e (FIG. 5). The narrow portion 62d of keyhole slot 62a extends to the right of latch 34. An extruded hole 62b at the left-hand end of slider 62 receives a link rod 64 which extends forwardly and downwardly relative to slider 62 and into an open end of cover plate 54 to be disposed along the under side of an upper flange of the cover plate 54. A bracket 66 (FIG. 7) is attached to the front face of circuit breaker 28 by a screw 68. Bracket 66 is essentially L-shaped, but has an upstanding tab 66a sheared from the forwardly projecting leg, leaving a pair of forwardly projecting outer tabs 66b extending to the inside surface of cover plate 54. As seen in FIG. 7, upstanding tab 66a and forwardly extending tabs 66b define, with the forward face and upper flange of cover plate 54, a pocket for link rod 64 to guide it for sliding movement along the cover plate 54. As seen in FIG. 3, the end of link rod 64 within the cover plate 54 is relieved at 64a to provide clearance for the hook end 60a of door interlock lever 60. That end of link rod 64 is disposed in the path of tab 58b of auxiliary operator handle 58 when the handle is slid leftward toward the switch ON position, tab 58b engages link rod 64 and the operator handle drives link rod 64 and slider 62 leftward, causing the narrow portion of 62d keyhole slot 62a to slide over the narrow portion 36a of oblong shaft 36 when the latch 34 is rotated such that pin 40 is in its upright blocking position. If the latch 34 is rotated, the pin 40 is withdrawn to a position parallel with the major dimension of channel 22. As a result the wide portion 36b of oblong shaft 36 will be disposed upright as viewed in FIG. 5 and will block movement of slider 62 to the left. This blocking action will be transmitted through link rod 64 to block auxiliary operator 58 from moving left to the ON position. A helical tension spring 70 is anchored between a tab 22a sheared from the upper surface of channel 22 and a tab 62c sheared from the slider 62 near hole 62b to bias slider 62 rightward. The bias provided by spring 70 causes the slider 62 to follow operator handle 58 when the operator handle is moved rightward to the circuit OFF position. It will be noted that a space is provided between the narrow end 62d of link rod 64 and the tab 58b in the OFF position and that additional space is provided at the end of keyhole slot 62a to insure that the interlock slider 62 and link rod 64 do not interfere with the operated positions of the switching apparatus.

The foregoing describes a preferred embodiment of an interlock mechanism for circuit interrupting apparatus of a motor control center or the like. The interlock mechanism is particularly adaptable for a linearly slidable auxiliary operator mechanism and is connected to a manually operable latch which is optimally located to prevent twisting of the control unit within the cabinet compartment such that a plug-in connector may become disengaged from a bus bar. The switching apparatus may be a molded case circuit breaker, a fusible switch or the like. It is to be understood that the interlock mechanism of this invention is susceptible of various modifications without departing from the scope of the appended claims.

We claim:

1. An interlock for a removable control unit of a motor control center comprising:

a motor control center cabinet having an opening for receiving a control unit, a structural member adjacent said opening, and electrical bus bars within said cabinet;

a control unit removably inserted into said opening, said control unit comprising:

plug-in terminal means engagable with said bus bars in an inserted position of said control unit;

switch means operable between ON and OFF positions connected to said plug-in terminal means;

operator means for operating said switch means between said ON and OFF positions; and a latch manually movable between extended and retracted positions thereof, said latch engaging said structural member in said extended position blocking removal of said control unit from said cabinet, said latch also abutting said structural member in said extended position blocking insertion of a removed said control unit into said opening;

wherein said interlock comprises:

a slider slidably mounted on said control unit;

means extending from said slider to a location proximate said operator means in said OFF position of said switch means; and cooperating means on said slider and said latch for permitting sliding movement of said slider in said extended position of said latch and for blocking sliding movement of said slider in said retracted position of said latch, said means extending from said slider blocking movement of said operator means from said OFF position to said ON position in said retracted position of said latch, thereby preventing insertion of said control unit into said cabinet or removal of said control unit from said cabinet with said switch means in said ON position.

2. The interlock of claim 1 wherein said cooperating means on said slider and said latch comprise a slot in said slider and a key portion on said latch oriented to fit within said slot in said extended position of said latch and oriented to be larger than said slot in said retracted position of said latch.

3. The interlock of claim 1 wherein said latch comprises a shaft rotatably mounted to said control unit and extending through a hole in said slider, said slider having a slot communicating with and extending from said hole, said slot being of reduced width relative to a diameter of said hole, and said shaft having an oblong cross-section, a longer dimension of which is greater than said width of said slot and a shorter dimension of which is less than said width of said slot.

4. The interlock of claim 3 wherein said latch comprises a member transversely disposed relative to said shaft, said member projecting above said control unit in said extended position and lying within said control unit in said retracted position.

5. The interlock of claim 1 wherein said means extending from said slider is disposed in a path of movement of said operator means for abutment by said operator means when moved from said OFF to said ON position of said switching means, said operator means driving said extending means and effecting sliding movement of said slider if said latch is in said extended position.

6. The interlock of claim 5 wherein said slider is biased against sliding movement effected by said operator means when moved from said OFF to said ON position of said switching means.

7. The interlock of claim 6 wherein said means extending from said slider is spaced from said operator in said OFF position of said switching means.

8. In a motor control center comprising:

a cabinet;

an opening in said cabinet;

a structural cabinet member adjacent said opening;

electrical bus bars within said cabinet; and a control unit removably inserted in said cabinet through said opening, said control unit comprising:

switching apparatus operable between ON and OFF positions;

plug-in terminal means electrically connected to said switching apparatus and engagable with said bus bars in an inserted position of said control unit;

operator means manually movable for operating said switching apparatus between said ON and OFF positions; and a latch manually movable between extended and retracted positions, said latch in said extended position engaging said structural member blocking insertion and removal of said control unit to and from said cabinet;

the improvement comprising an interlock between said latch and said operator means, said interlock blocking movement of said operator means to an ON position of said switching apparatus in a retracted position of said latch.

9. The interlock of claim 8 comprising:

a slider slidably mounted on said control unit;

means connected with said slider extending into a path of movement of said operator means; and cooperating means on said slider and said latch engagable in said retracted position of said latch for preventing sliding movement of said slider.

10. The interlock of claim 9 wherein said slider comprises a keyhole slot and said latch comprises a shaft rotatably journaled in said control unit and extending through an enlarged portion of said keyhole slot, said shaft comprising an oblong cross-section having a major dimension greater than a narrow portion of said keyhole slot.

11. The interlock of claim 10 wherein said latch comprises a member disposed transversely to an axis of said shaft, and said shaft is rotatable about said axis to rotate said member between said extended and said retracted positions.

\* \* \* \* \*